April 15, 1924.

O. J. LUNDQUIST 1,490,838

COMBINATION TOOL HOLDER

Filed June 6, 1921    2 Sheets-Sheet 1

Oscar J. Lundquist.
INVENTOR

BY Victor J. Evans
ATTORNEY

John Babis Jr.
WITNESS:

April 15, 1924.

O. J. LUNDQUIST 1,490,838

COMBINATION TOOL HOLDER

Filed June 6, 1921    2 Sheets-Sheet 2

Oscar J. Lundquist.
INVENTOR

BY Victor J. Evans
ATTORNEY

John Babis Jr.
WITNESS:

Patented Apr. 15, 1924.

1,490,838

UNITED STATES PATENT OFFICE.

OSCAR J. LUNDQUIST, OF PHILADELPHIA, PENNSYLVANIA.

COMBINATION TOOL HOLDER.

Application filed June 6, 1921. Serial No. 475,379.

*To all whom it may concern:*

Be it known that I, OSCAR J. LUNDQUIST, a subject of the King of Sweden, residing at Philadelphia, in the county of Philadelphia and State of Pennsylvania, have invented new and useful Improvements in Combination Tool Holders, of which the following is a specification.

This invention relates to improvements in lathes and has for an object the provision of a tool holder for lathes which is designed to accommodate a number of different tools and which is capable of being quickly and easily adjusted, so as to bring the desired tool into position for use. This results in a saving of time usually required for changing tools and greatly increases the amount of work which may be produced upon the lathe.

Another object is the provision of a lathe tool holder, which in addition to holding tools, may be utilized as a centering device, means being provided for quickly and accurately centering the work with respect to the lathe chuck.

A further object of the invention is the provision of a tool holder which includes the above and other advantages and which is simple of construction and may be easily and quickly adjusted upon the lathe carriage and subsequently adjusted to bring the desired tool into proper position for use.

With the above and other objects in view, the invention further includes the following novel features and details of construction, to be hereinafter more fully described, illustrated in the accompanying drawings and pointed out in the appended claim.

In the drawings:—

Figure 1:
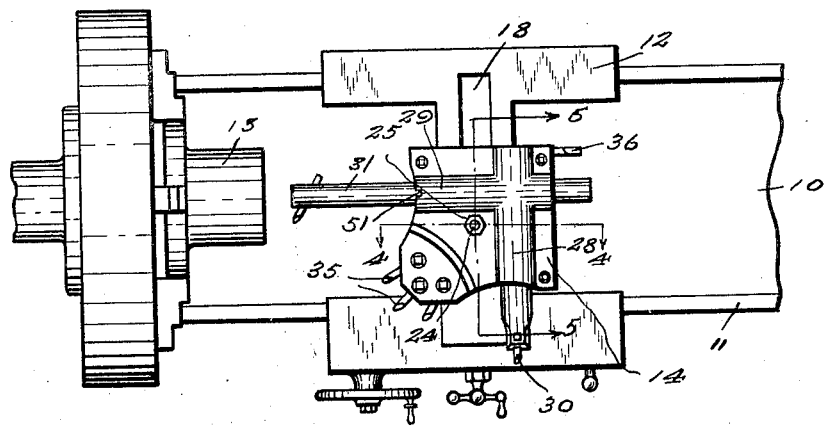
Figure 1 is a top plan view of a portion of a lathe with the tool holder in position for use.
Figures 2, 3:
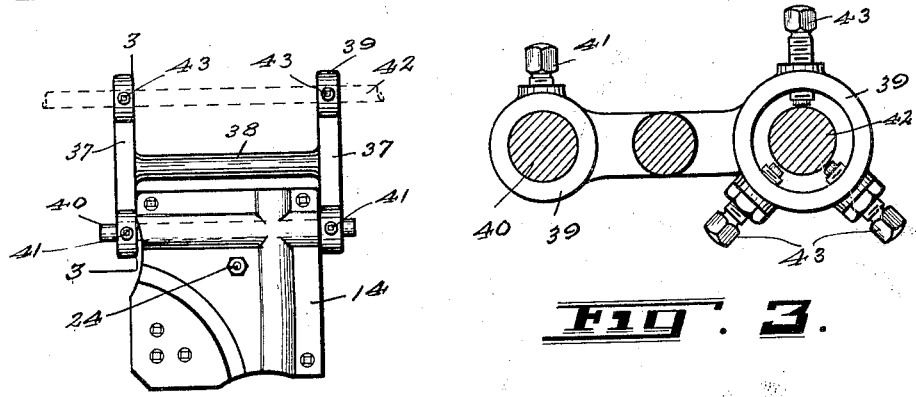
Figure 2 is a plan view of the tool holder showing the manner of attaching the shaft centering device or cathead thereto.
Figure 3 is an enlarged section on the line 3—3 of Figure 2.
Figure 4:
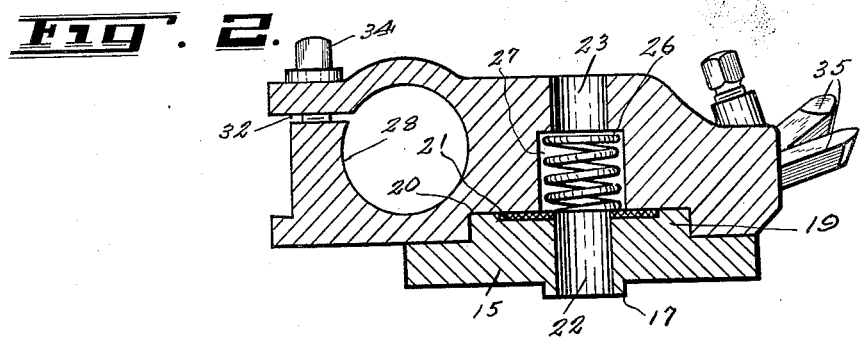
Figure 4 is an enlarged sectional view on the line 4—4 of Figure 1 showing the tool holder removed from the lathe.

Referring in detail to the drawings, wherein like characters of reference denote corresponding parts, the reference character 10 indicates a lathe bed which is provided with ways 11 upon which is slidingly mounted a carriage 12. This carriage is designed to be moved away from and toward the chuck 13. All of the foregoing is of the usual or any preferred construction.

The tool holder which is indicated generally at 14 comprises a base 15 and a tool carrying member 16. The base is provided with an extension 17 which is designed to be slidingly received within the slot 18 provided in the carriage 12. This slot extends transversely of the lathe so that the tool holder may be moved in this direction to secure proper adjustment.

The tool carrying member 16 is rotatably mounted upon the base 15 and for this purpose the latter is provided with a circular boss 19 which enters a similarly shaped socket 20 formed in the under face of the tool carrying member 16. The boss 19 is formed with an annular row of teeth or serrations 21 which are adapted to bite into the bottom of the socket 20 to hold the member 16 against rotation after adjustment has been effected. Extending through aligned openings 22 and 23 provided respectively in the base 15 and member 16 is a bolt 24. This bolt also extends through the slot 18 and has its head positioned against the under face of the carriage 12, while a nut 25 is mounted upon the opposite end of the bolt and when this nut is adjusted, the holder will be prevented from both transverse and rotary adjustment. A spring 26 surrounds the bolt 24 and is located within a counterbore 27 formed in the member 16. One end of this spring bears against the base 15 so that these parts may be readily separated when the nut 25 is loosened and proper adjustment of the tool carrying member 16 is effected.

The member 16 is provided with oppositely arranged bores 28 and 29, which are designed to receive suitable tools 30 and 31, the said member being split as shown at 32 and 33 and adjusted by means of adjusting nuts 34 so that the tools 30 and 31 will be properly held. In addition, the tool carrying member 16 is provided with a plurality of cutters 35 which extend therefrom at different angles and these cutters and the tools 30 and 31 are designed to be positioned for use through rotary adjustment of the tool carrying member 16. An additional cutting off tool 36 is also carried by the member 16 and may be brought into position for use through the rotary adjustment of the tool holder.

In addition to providing a holder for tools, the invention is capable of use as a centering device and for this purpose there is provided a cathead attachment which is formed of spaced parallel members 37 which are connected centrally by a bar 38. Each of the members 37 is provided at each end with an opening or eye 39, one end being adapted to receive a bar 40. This bar is adapted to be positioned within one of the bores, for example the bore 29 of the member 16 and to be clamped in the eyes 39 by means of the adjusting screws 43. The members 37 comprising the centering device may thus be positioned to be pivotally and vertically adjusted through the medium of set screws 41. The eyes 39 at the opposite end of the members 37 are adapted to receive the work indicated at 42 which may be adjusted with respect to the lathe chuck and held against rotation by means of the set screws 43. After the bar has been properly adjusted with respect to the center of the chuck, the lathe carriage may be fed to a countersink carried by the chuck for the purpose of forming a center in the end of the bar 42. By forming a cathead with the spaced eyes 39, the bar may be positioned in exact alignment with the axial center of the chuck and securely held in such position. It is of course understood that if this centering device is used, one of the tool holding arms 31 or 30 is removed and the shaft 40 substituted therefor.

Figure 5:
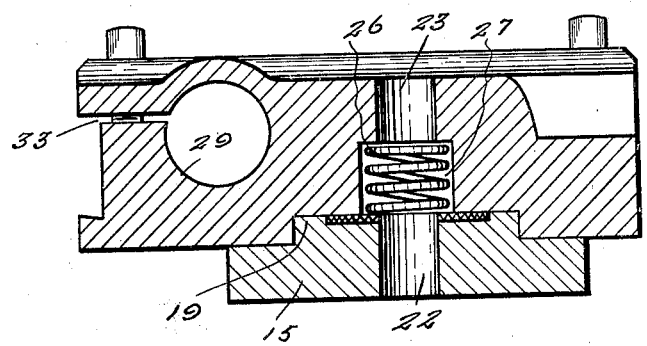
Figure 5 is a similar view on the line 5—5 of Figure 1.
Figure 6:
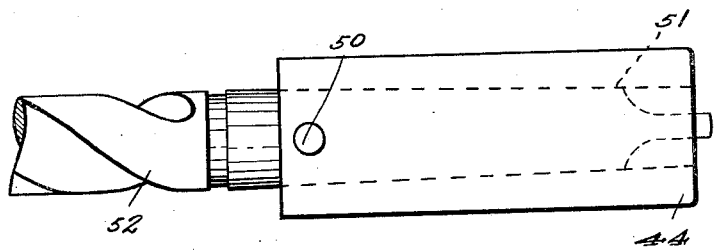
Figure 6 is a detail view illustrating a drill bit and sleeve capable of being secured in the tool holder.
Figure 7:
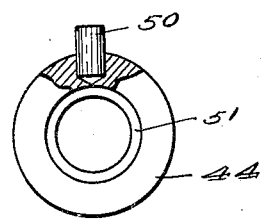
Figure 7 is an end view of the sleeve partly broken away.

In Figures 5 and 6 there is shown a sleeve 44 which is adapted to be received within the bores 28 or 29 and held against rotation therein through the engagement of a stud 50 with a notch 51 formed at the end of the bores. The sleeve 44 has a tapered bore 51' for the reception of the tapered shank of a drill 52 and provides means whereby the tool holder may be utilized for holding a tapered drill.

The invention is susceptible of various changes in its form, proportions and minor details of construction and the right is herein reserved to make such changes as properly fall within the scope of the appended claim.

Having described the invention what is claimed is:—

A tool holder for lathes comprising a base, a downwardly disposed extension provided on the base, said base and extension having an opening extending therethrough, a circular boss upon the top of the base and disposed concentrically with respect to the opening, a tool carrying member having a circular recess to receive the boss, a concentrically arranged socket extending from the recess and a concentrically arranged opening extending from the socket in alignment with the first mentioned opening, a bolt extending through the openings for adjustably securing the work holder to the lathe, a spring located within the socket and means for securing tools within the tool holder.

In testimony whereof I affix my signature.

OSCAR J. LUNDQUIST.